(12) United States Patent
Roberts et al.

(10) Patent No.: US 9,830,605 B2
(45) Date of Patent: Nov. 28, 2017

(54) APPARATUS AND METHOD FOR PRODUCT MARKETING

(75) Inventors: Linda Roberts, Decatur, GA (US);
E-Lee Chang, Mableton, GA (US);
Ja-Young Sung, Atlanta, GA (US);
Natasha Barrett Schultz, Lawrenceville, GA (US); Robert Arthur King, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1319 days.

(21) Appl. No.: 12/609,826

(22) Filed: Oct. 30, 2009

(65) Prior Publication Data
US 2011/0106612 A1    May 5, 2011

(51) Int. Cl.
*G06Q 30/02*    (2012.01)

(52) U.S. Cl.
CPC ......... *G06Q 30/02* (2013.01); *G06Q 30/0244* (2013.01); *G06Q 30/0245* (2013.01)

(58) Field of Classification Search
CPC .................................................. G06Q 30/0244
USPC ...................................................... 705/14.43
See application file for complete search history.

(56) References Cited

U.S. PATENT DOCUMENTS

| | | | |
|---|---|---|---|
| 5,223,924 A | 6/1993 | Strubbe | |
| 5,920,694 A | 7/1999 | Carleton et al. | |
| 6,177,945 B1 * | 1/2001 | Pleyer | 345/473 |
| 6,272,231 B1 | 8/2001 | Maurer et al. | |
| 6,357,042 B2 | 3/2002 | Srinivasan et al. | |
| 6,438,579 B1 | 8/2002 | Hosken | |
| 6,567,797 B1 | 5/2003 | Schuetze et al. | |
| 6,580,811 B2 | 6/2003 | Maurer et al. | |
| 6,732,146 B1 | 5/2004 | Miyake | |
| 6,792,412 B1 | 9/2004 | Sullivan et al. | |
| 6,948,131 B1 | 9/2005 | Neven et al. | |
| 7,031,931 B1 | 4/2006 | Meyers | |
| 7,051,352 B1 | 5/2006 | Schaffer | |
| 9,129,008 B1 * | 9/2015 | Kuznetsov | G06F 17/30038 |
| 2002/0010759 A1 | 1/2002 | Hitson et al. | |

(Continued)

OTHER PUBLICATIONS www.youtube.com, "Netflix Party on XBox Live", 3-page article, http://www.youtube.com/watch?v=_FuPxEC8Tfc &feature=related, web site last visited Jan. 20, 2010.

(Continued)

*Primary Examiner* — David Stoltenberg
(74) *Attorney, Agent, or Firm* — Guntin & Gust, PLC; Joseph Hrutka

(57) ABSTRACT

A system that incorporates teachings of the present disclosure may include, for example, a media processor having a controller to present media content provided by a media content source operating in an interactive television (iTV) network, access a client program which presents an overlay that superimposes onto the media content, wherein the client program enables the media processor to associate at least a portion of the media content with a user-generated comment, receive the user-generated comment, wherein the user-generated comment provides commentary on the portion of the media content, associate the user-generated comment with the portion of the media content, and transmit the user-generated comment to a third party for determination of marketing parameters of the portion of the media content. Other embodiments are disclosed.

20 Claims, 8 Drawing Sheets

(56) References Cited

U.S. PATENT DOCUMENTS

| | | |
|---|---|---|
| 2002/0059094 A1 | 5/2002 | Hosea et al. |
| 2002/0097265 A1 | 7/2002 | Kurapati et al. |
| 2002/0133405 A1* | 9/2002 | Newnam .............. G06Q 30/02 705/14.58 |
| 2002/0162107 A1 | 10/2002 | Gutta et al. |
| 2002/0178057 A1 | 11/2002 | Bertram et al. |
| 2002/0193066 A1* | 12/2002 | Connelly .................... 455/2.01 |
| 2002/0194586 A1 | 12/2002 | Gutta et al. |
| 2002/0199194 A1 | 12/2002 | Ali |
| 2003/0066068 A1 | 4/2003 | Gutta et al. |
| 2003/0101450 A1* | 5/2003 | Davidsson et al. ............ 725/32 |
| 2003/0182663 A1* | 9/2003 | Gudorf ................ H04N 7/173 725/110 |
| 2003/0196206 A1* | 10/2003 | Shusman ....................... 725/91 |
| 2003/0234805 A1 | 12/2003 | Toyama et al. |
| 2004/0003392 A1 | 1/2004 | Trajkovic et al. |
| 2004/0059625 A1* | 3/2004 | Schrader ........................ 705/10 |
| 2004/0064526 A1 | 4/2004 | Lee et al. |
| 2005/0144632 A1 | 6/2005 | Mears et al. |
| 2005/0149974 A1 | 7/2005 | Norman |
| 2006/0020614 A1 | 1/2006 | Kolawa et al. |
| 2006/0026502 A1 | 2/2006 | Dutta |
| 2006/0168150 A1 | 7/2006 | Naik et al. |
| 2006/0184989 A1* | 8/2006 | Slothouber ....... G06F 17/30861 725/110 |
| 2006/0190966 A1 | 8/2006 | McKissick et al. |
| 2006/0218481 A1 | 9/2006 | Adams, Jr. et al. |
| 2006/0259355 A1 | 11/2006 | Farouki et al. |
| 2006/0259469 A1* | 11/2006 | Chiu .................. G06F 17/30017 |
| 2006/0271997 A1 | 11/2006 | Jacoby et al. |
| 2006/0288041 A1 | 12/2006 | Plastina et al. |
| 2007/0011039 A1 | 1/2007 | Oddo |
| 2007/0124756 A1* | 5/2007 | Covell et al. .................... 725/18 |
| 2007/0174255 A1* | 7/2007 | Sravanapudi et al. ............ 707/3 |
| 2007/0245243 A1* | 10/2007 | Lanza ............... G06F 17/30817 715/723 |
| 2007/0276864 A1* | 11/2007 | Espelien .................... 707/103 X |
| 2009/0089162 A1* | 4/2009 | Davis ..................... G06Q 30/00 705/14.73 |
| 2009/0204640 A1* | 8/2009 | Christensen ........... G06Q 30/02 |
| 2009/0271417 A1* | 10/2009 | Toebes ................ G06F 17/3087 |
| 2009/0322652 A1* | 12/2009 | Adderton .............. H04L 12/581 345/2.3 |
| 2009/0328122 A1* | 12/2009 | Amento ............. H04N 7/17318 725/114 |
| 2010/0070992 A1* | 3/2010 | Morris et al. ................... 725/32 |
| 2010/0293035 A1* | 11/2010 | Athsani ................. G06Q 30/02 705/14.58 |
| 2012/0059845 A1* | 3/2012 | Covell et al. ................. 707/769 |
| 2013/0298147 A1* | 11/2013 | Klein ............... H04N 21/23424 725/13 |

OTHER PUBLICATIONS www.youtube.com, "NXE Dashboard, Aug. 11, Update Preview Program—Netflix Party", 2-page article, http:/www.youtube.com/watch?v=2brb-gCt2ss, web site last visited Jan. 20, 2010.

Georgia Tech., "Avatar Theater—Experimental TV Lab at Georgia Lab", 2-page article, http://etv.gatech.edu/projects/avatar-theater!, web site last visited Jan. 20, 2010.

Konstantinos Chorianopoulos, "Content-Enriched Communication—Supporting the Social Uses of TV", 10-page article, The Journal of the Communications Network, vol. 6, Part 1, Jan.-Mar. 2007.

Khadraoui et al., "Interactive TV Show Based on Avatars", IEEE: Systems Communications, 2005, Proceedings, Aug. 17, 2005, pp. 192-197.

Luyten et al., "Telebuddies: Social Stitching with Interactive Television" Hasselt University—Transnationale Universiteit Limburg, Belgium, 6-page article, CHI 2006, Apr. 22-27, 2006.

Weisz et al., "Watching Together: Integrating Text Chat with Video", Carnegie Mellon University/University of Minnesota, 10-page article, CHI 2007, Apr. 28-May 3, 2007.

Coppens et al., "AmigoTV: Towards a Social TV Experience", Alcatel Bell R&I Residential Networked Applications, 4-page article.

Nathan et al., "CollaboraTV: Making Television Viewing Social Again", pp. 85-94, axTV'08, Oct. 22-24, 2008.

Oehlberg et al., "Designing for Distributed, Sociable Television Viewing", Stanford University, Mechanical Engineering, Palo Alto Research Center, 10-page article.

* cited by examiner

500

APPARATUS AND METHOD FOR PRODUCT MARKETING

FIELD OF THE DISCLOSURE

The present disclosure relates generally to product marketing and more specifically to an apparatus and method for product marketing.

BACKGROUND

Companies and individuals who provide products and services to consumers typically invest a tremendous amount of time and resources for marketing their various products and services. Products and services are often marketed through traditional newspapers, magazines, television, the Internet, and through other means. The effectiveness of the marketing for a particular product or service can often directly influence sales and consumer perceptions associated with the products and/or services. Accordingly, determining the effectiveness of the marketing for products and services can assist companies in identifying areas for improvement, identifying which products and services are perceived as unfavorable or favorable, and determining which marketing strategies have a stronger impact with consumers than others. Enabling consumers to provide commentary on products and services can aid in determining the effectiveness of the marketing.

DETAILED DESCRIPTION

One embodiment of the present disclosure can entail a media processor having a controller to present media content provided by a media content source operating in an interactive television (iTV) network, access a client program which presents an overlay that superimposes onto the media content, wherein the client program enables the media processor to associate at least a portion of the media content with a user-generated comment, receive the user-generated comment, wherein the user-generated comment provides commentary on the portion of the media content, associate the user-generated comment with the portion of the media content, and transmit the user-generated comment to a third party for determination of marketing parameters of the portion of the media content.

Another embodiment of the present disclosure can a method including transmitting a client program to a media processor operating in an iTV network, wherein the client program comprises a graphical user interface (GUI) which presents an overlay that superimposes onto media content presented at the media processor, receiving a user-generated comment from the media processor via the client program, wherein the user-generated comment is associated with the media content presented at the media processor, and determining marketing parameters of the media content based on the user-generated comment, the marketing parameters being associated with at least one of a product and service advertised by the media content.

Yet another embodiment of the present disclosure can entail a computer-readable storage medium having computer instructions to transmit a request for media content and a first user-generated comment associated with the media content to a computing device, wherein the first user-generated comment is associated with the media content by a media processor in communication with the computing device, receive the media content and the first user-generated comment from the computing device, receive a second user-generated comment associated with the media content in response to receiving the media content, and transmit the second user-generated comment to the computing device, wherein the computing device determines marketing parameters of the media content based on at least one of the first and second user-generated comments.

Figure 1:
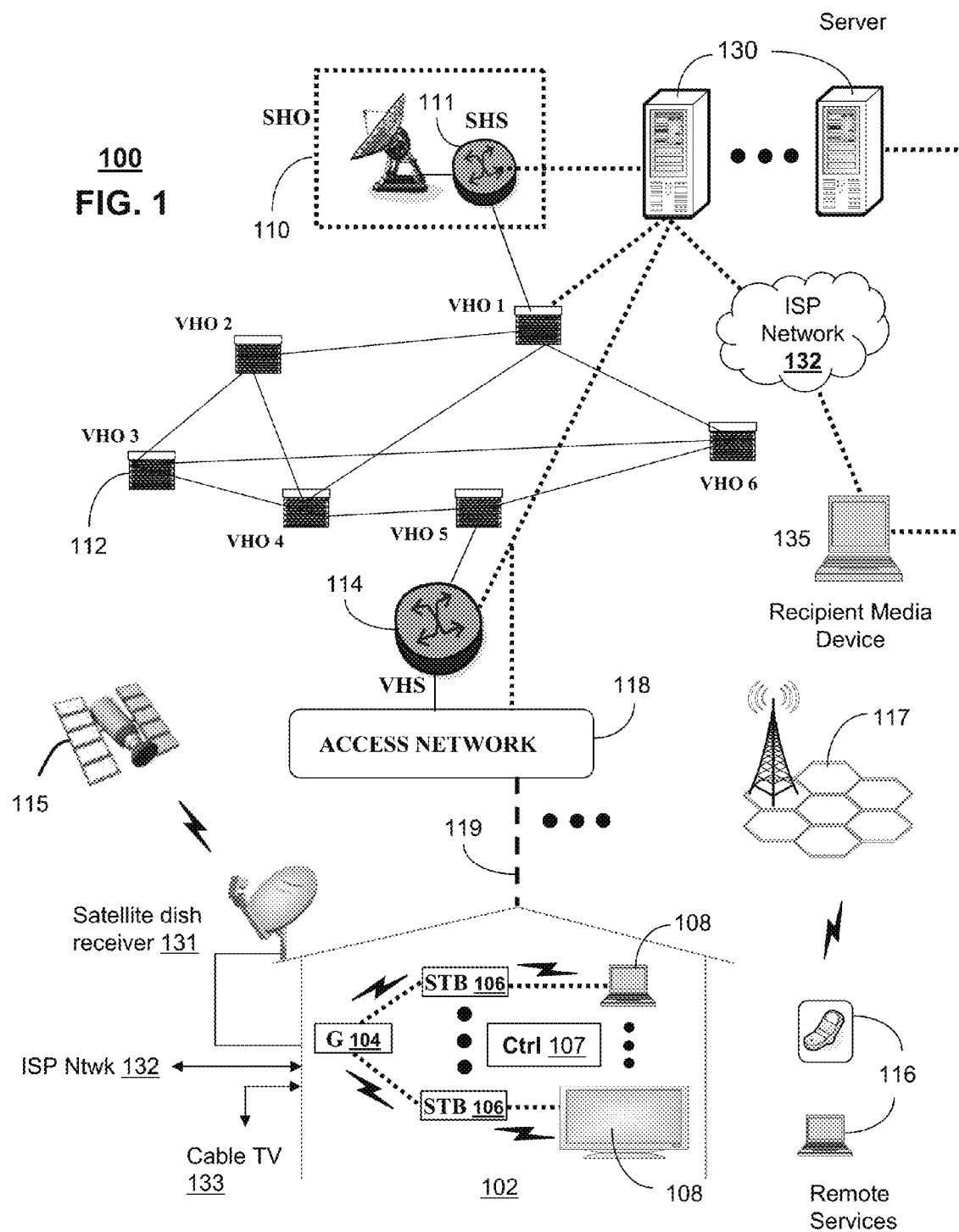
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

The first communication system 100 can also include a recipient media device 135. The recipient media device 135 can be configured to operate in an iTV network, which can include, but is not limited to including, IPTV, interactive cable television, and interactive satellite television. Additionally, the recipient media device 135 can be communicatively linked to the ISP network 132, the one or more computing devices 130, and to other devices in the system 100. Furthermore, the recipient media device 135 can be a STB, mobile device, personal computer, telephone, personal digital assistant (PDA), or other device capable of requesting, receiving, and transmitting media content.

Operatively, the recipient media device 135 can be configured to transmit a request for media content and user-generated comments associated with the media content. The media content can be video content, audio content, still image content, text content, and other types of content. For example, the content can be previews for audio and video content, advertisements, and promotional content. The various devices in the system 100 can be configured to relay and/or receive the requests from the recipient media device 135. Such devices can include, but are not limited to including, the computing devices 130, the STBs 106, media devices 108, and wireless communications device 116. The recipient media device 135 can be also be configured to receive requests for media content and/or user-generated comments associated with the media content that is received at the recipient media device 135. Once the requests are received, the recipient media device 135 can relay the media content and/or the user-generated comments to the requesting devices.

Another distinct portion of the computing devices 130 can function as a server (herein referred to as server 130). The server 130 can use common computing and communication technology to perform the function of receiving and processing media content, user-generated comments, and data. The server 130 can be configured to have access to or maintain a client program. Notably, the server 130 can enable the devices in the system 100 to access the client program and/or download the client program from the server 130 or otherwise. The client program itself can be configured to present an overlay that can be superimposed onto media content presented at a device utilizing the client program. Additionally, the client program can allow users comment on the presented media content.

Once the client program has received comments from users commenting on the presented media content, the client program can transmit the media content and/or comments to the server 130 for processing. The server 130 can then be configured to determine marketing parameters of the media content based on the user-generated comments. The marketing parameters can include, but are not limited to including, demographic parameters, psychographic parameters, popularity parameters, and promotional effectiveness parameters. The content of the comments can also be analyzed to determine the effectiveness of the media content. Based on the various values determined for parameters of the media content and/or the analyzed comments, the media content can be improved or otherwise altered to satisfy the needs of a target marketing segment. The improved and/or altered content can then be transmitted to a device in the system 100.

Additionally, the server 130 can be configured to receive requests for the media content and the user-generated comments associated with the media content from the devices in the system 100, such as the recipient media device 135 and the STBs 106. Furthermore, the server 130 can relay and/or store the actual media content and/or the user-generated comments associated with the media content.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
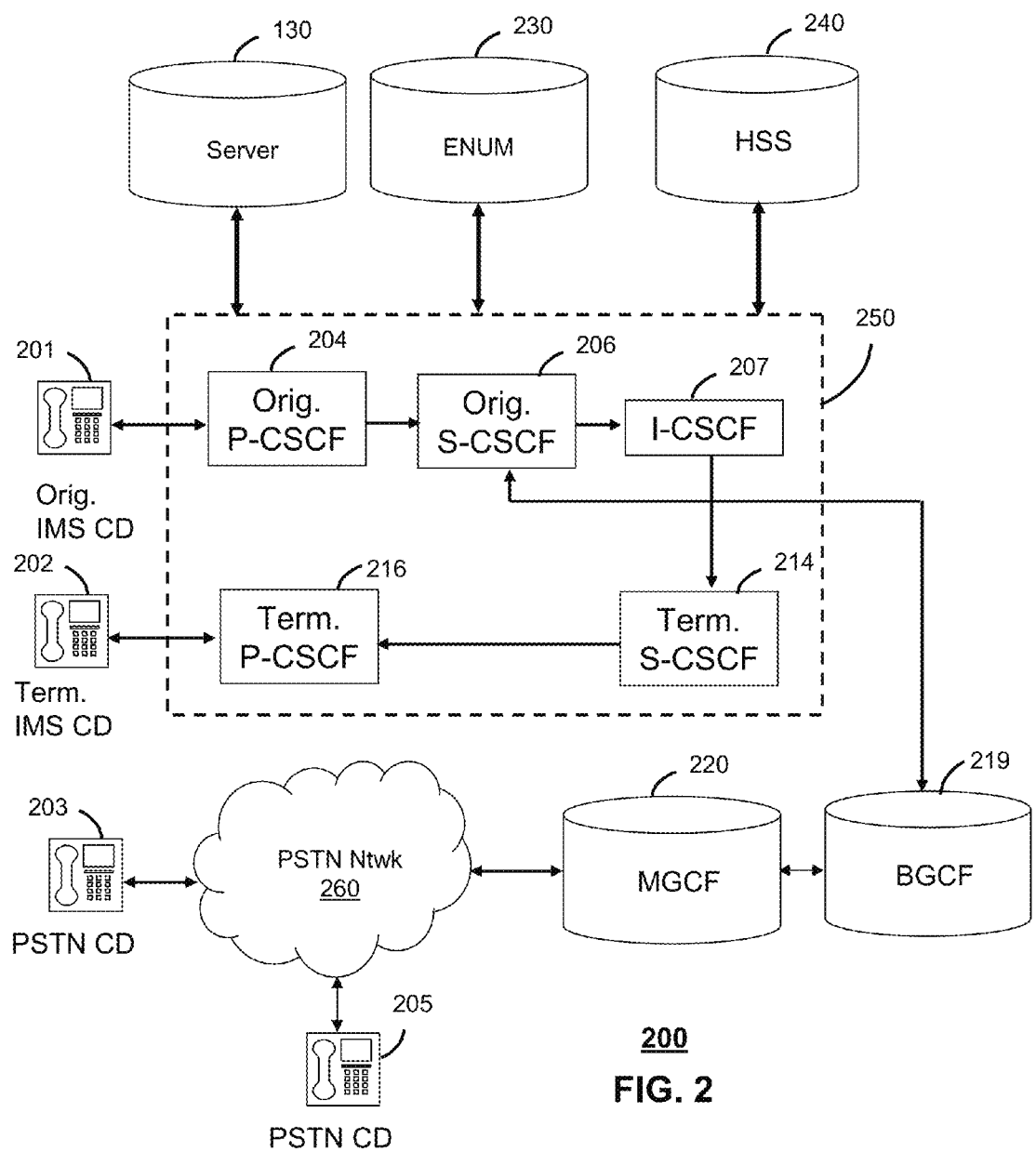

FIG. 2 depicts an illustrative embodiment of a communication system 200, employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The server 130 of FIG. 1 can be operably coupled to the second communication system 200 for purposes similar to those described above.

Figure 3:
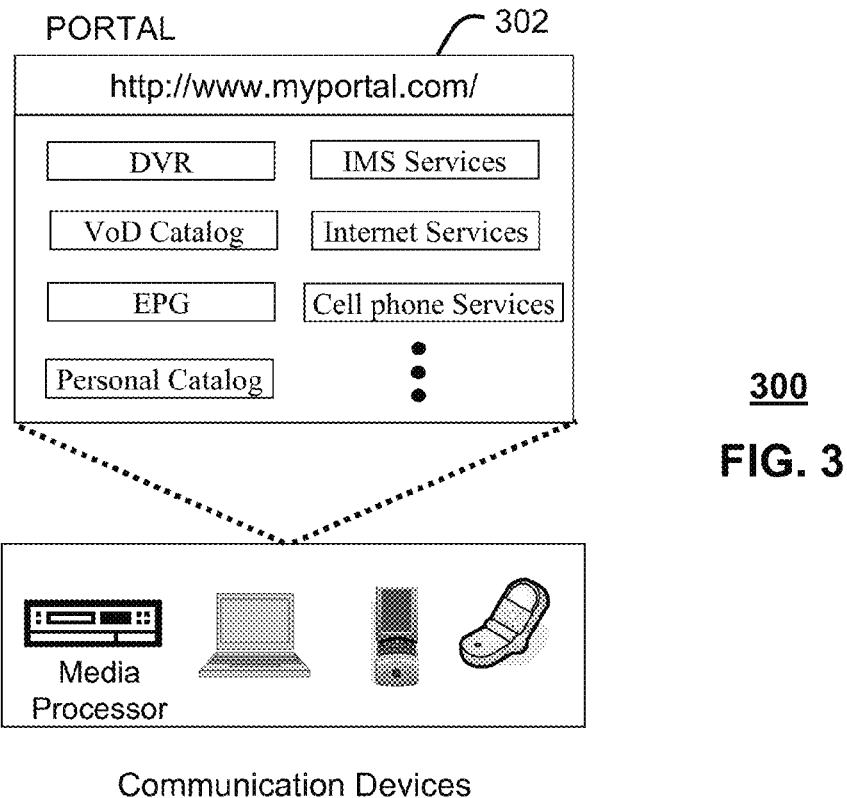
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
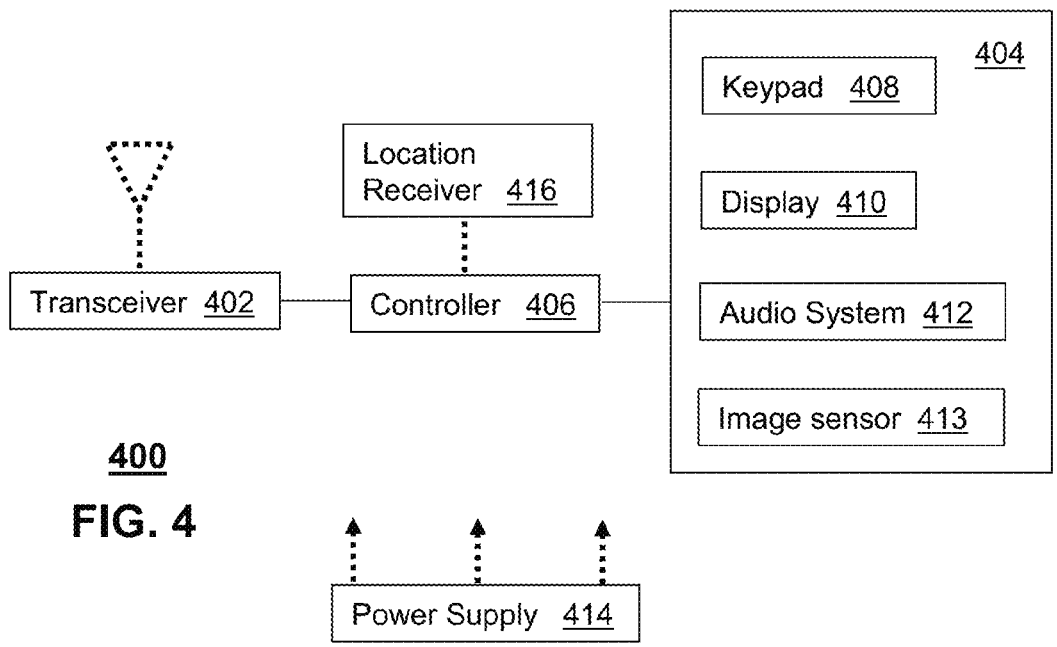
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1×, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
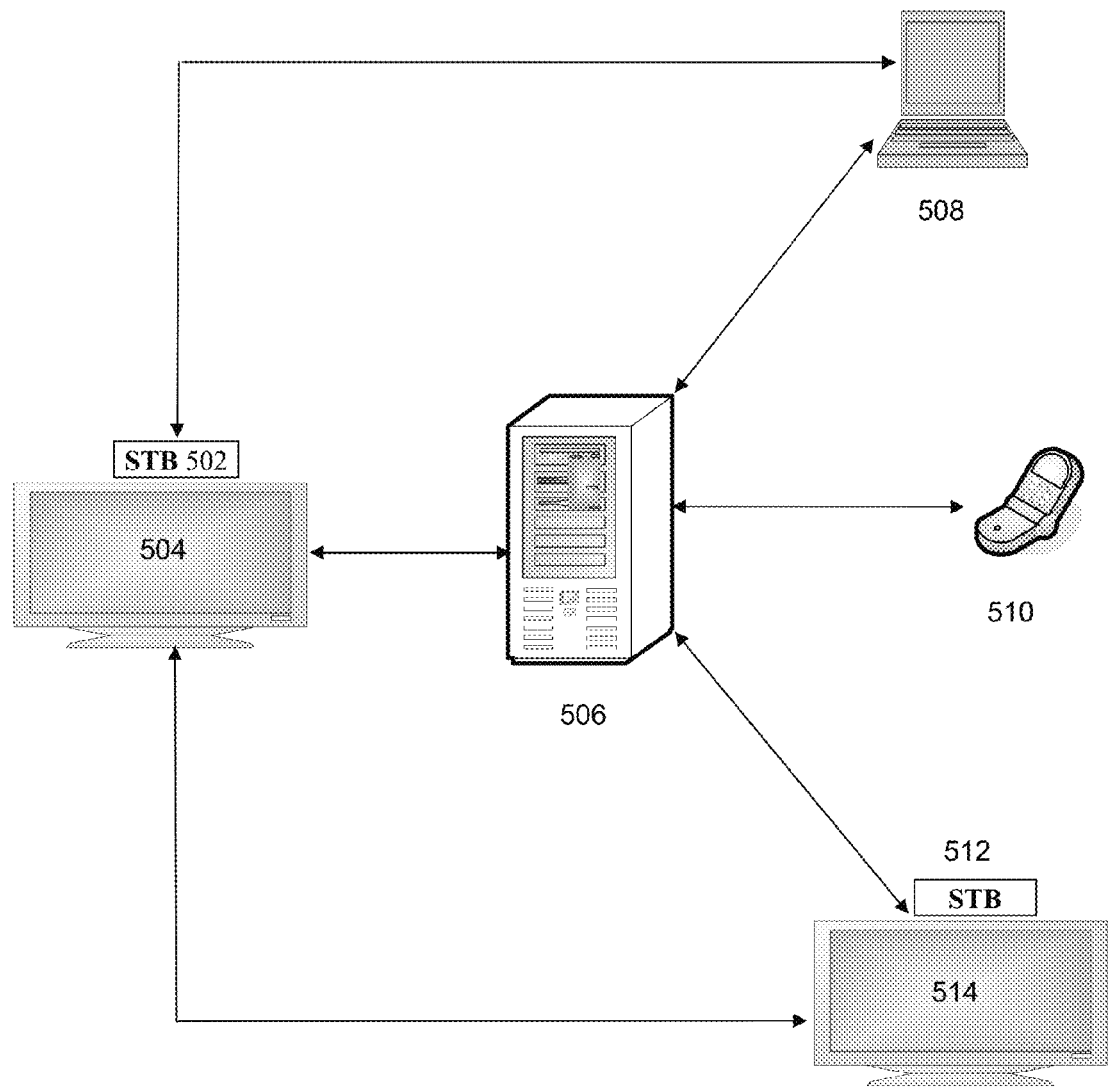
FIG. 5 depicts an illustrative embodiment of a system for product marketing, the system operable in the communications systems of FIGS. 1-2.

FIG. 5 depicts an illustrative embodiment of a system 500 for product marketing, the system 500 being operable in portions of the communications systems of FIGS. 1-2. The system 500 can include a media device 502, which can be configured to deliver media content and data to display device 504. The media device 502 can be a STB, personal computer, mobile device, or other similar device. The display device 504 can be a monitor, television, cellular phones, personal digital assistants (PDA), computers, or other device capable of displaying media content. System 500 can also include a server 506, which can be a third party server, and can be a device including the operative features of server 130, among other features. The server 506 can be in communication with the media device 502 and the other devices of the system 500. Notably, the server 506 can include or have access to a client program, which can be configured to present an overlay that can be superimposed onto media content that is displayed and/or received at the devices in the system 500. The client program can be utilized to receive comments from users utilizing the devices in the system 500 and to transmit the comments to the server 506.

Additionally, the system 500 can include a computing device 508, a communications device 510, and a media device 512. The computing device 508 can be a personal computer, laptop, or other similar device. The communications device 510 can include, for example, a mobile device, a cellular phone, wireless device, or other communications device. The media device 512 can be much like media device 502 and can be a STB, personal computer, mobile device, or other similar device. Also, the media device 512 can be operably coupled to a display device 514, which like display device 504, can be a monitor, television, or other display device capable of presenting media content. The devices in the system 500 can be configured to operate in an iTV network, which can include IPTV, satellite television, and cable television. Additionally, the devices in the system 500 can all be in communication with each other and the server 506 can act as an intermediary between the devices, although this does not have to be the case. Other arrangements are contemplated as well.

Operatively, when a user, such as a user of media device 502, is watching or otherwise experiencing media content presented on the display device 504, the user can utilize the client program to provide user-generated comments related to the media content or otherwise. The media content can be a video clip, audio clip, text content, still image content, advertising content, promotional content, sampling content, or other content. For example, the user can be watching an advertisement for a car and can decide to comment on the advertisement. When the user decides that he or she wants to make a comment, the user can utilize the media device 502 to access the client program to comment on the advertisement. The user can type in the comment or speak the comment and the client program can be configured to receive it.

Figure 6:
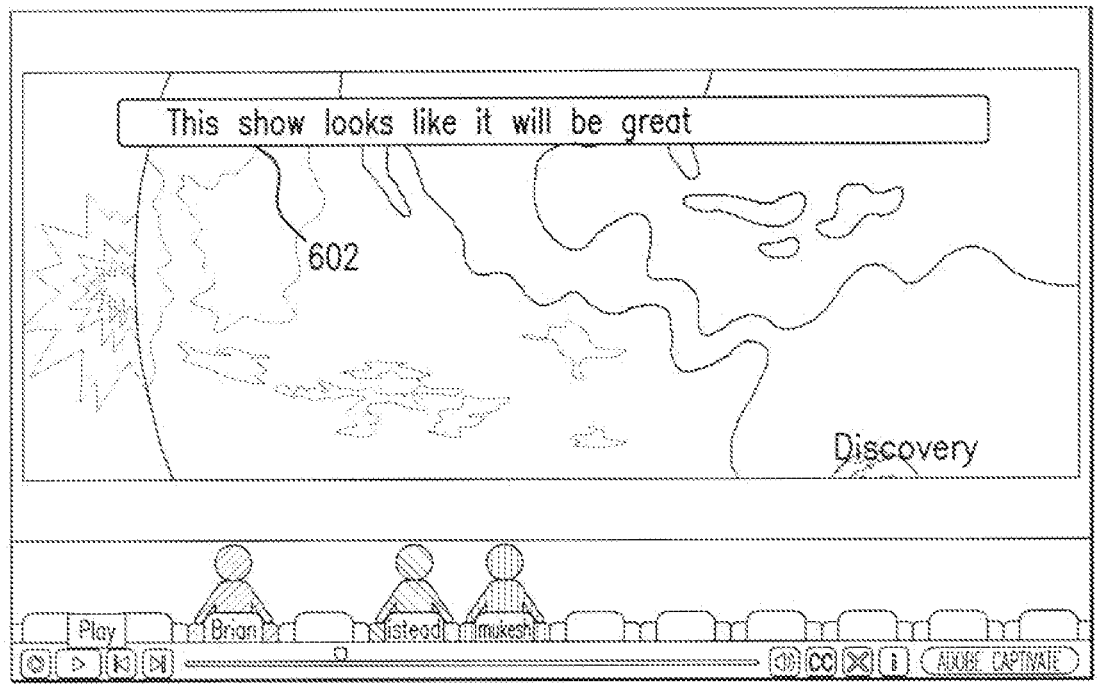
FIG. 6 depicts a screenshot illustrating a user entering a comment for preview of a media program.
Figure 7:
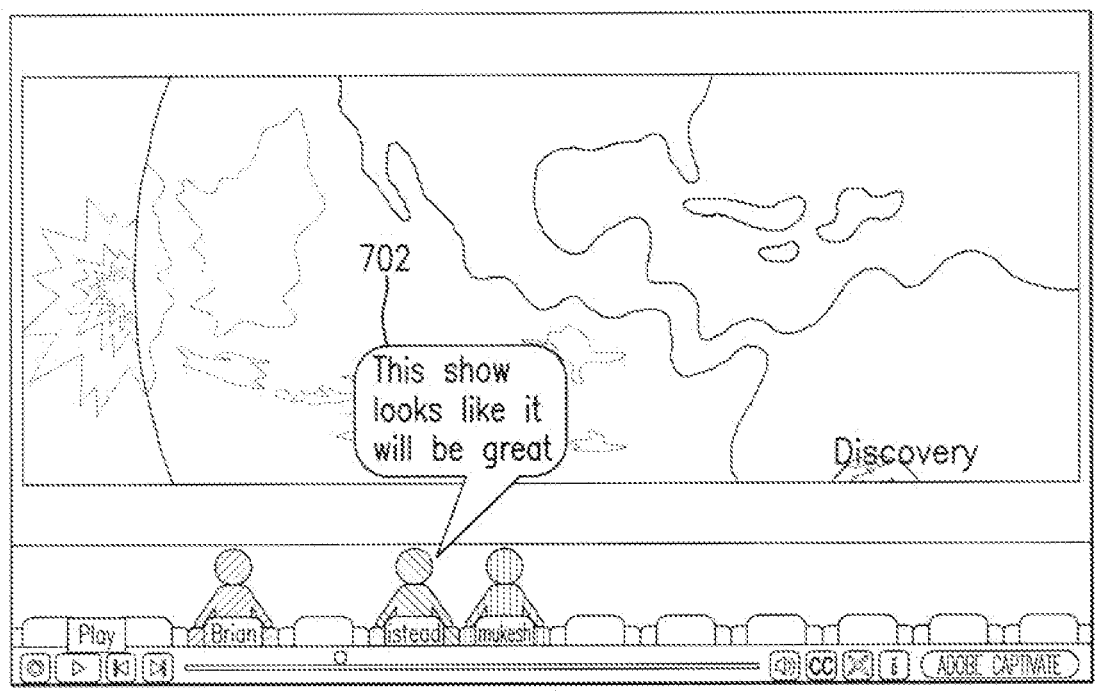
FIG. 7 illustrates a screenshot which displays a comment received by the user of FIG. 6.

Referring now also to FIG. 6, a screenshot 600 illustrating a user entering a comment for a preview of a media program is shown. The screenshot 600 depicts a user who has selected an option to make a comment on the preview. The option presents the user with a text box 602 in which the user can type in his or her comment on the preview. Referring now also to FIG. 7, a screenshot 700 which displays the comment received by the user of FIG. 6 is illustratively shown. The screenshot 700 shows a caption box 702, which displays the captured text associated with the preview that was input by the user. Once the user-generated comment is received by the client program, the client program can associate the comment with the media content and the media device 502 can transmit the user-generated comment and/or the media content to the server 506 and or to the other devices of the system 500.

When the server 506 receives the user-generated comment and/or other information associated with a user, the server 506 can be configured to determine marketing parameters of the media content based on the user-generated comment and/or attributes of the user making the comment. The marketing parameters can include, but are not limited to including, demographic parameters, psychographic parameters, popularity parameters, and promotional effectiveness parameters. The demographic parameters can be associated with the age, location, gender, race, income, and other attributes of users. Psychographic parameters can be associated with the personality, attitudes, values, lifestyle, and/or interests of the users. Popularity parameters can be utilized to indicate how popular a particular advertisement, promotion, or other media content is. Promotional effectiveness parameters can indicate how effective an advertisement or other promotion was to the user. In an embodiment, the marketing parameters can be associated with a product and/or service advertised by the media content.

The server 506 can be configured to analyze the marketing parameters and/or the content of the comment to determine the effectiveness of the media content. Additionally, third party users can also analyze the comments and/or marketing parameters to identify successful advertisements, unsuccessful advertisements, popular media content, and/or other relevant information. The analyses can be stored by the server 506 and can be utilized to improve the media content/advertisements. The third party users can alter the media content and/or generate new substitute content if user-generated comments indicate that a particular type of media content or advertisement was ineffective. Once the altered and/or new substitute content is generated, the server 506 can transmit the altered or substituted content to any of the devices in the system 500 for presentation. The users of the devices of system 500 can then provide comments on the altered and/or substitute content.

The devices in the system 500 can also be configured to transmit requests for the media content and user-generated comments from the other devices in the system 500. For example, continuing with the above example, if a user of media device 502 has made a comment on a particular advertisement or media program, the users of computing device 508, communications device 510, and media device 512 can request the comments and/or the media content from the media device 502. The request can be received first by the server 506, which can then retrieve the comments and/or media content from media device 502, or the devices can also directly connect to media device 502 to receive the comments and/or media content.

Once the requesting devices receive the comments and/or media content from the media device 502, users of the requesting devices can provide their own comments about the media content or even provide commentary on the other users' comments. Any comments generated by the requesting devices can similarly be transmitted to the server 506 or other devices of the system 500. The server 506 can determine marketing parameters based on the comments coming from the requesting devices as well.

Figure 8:
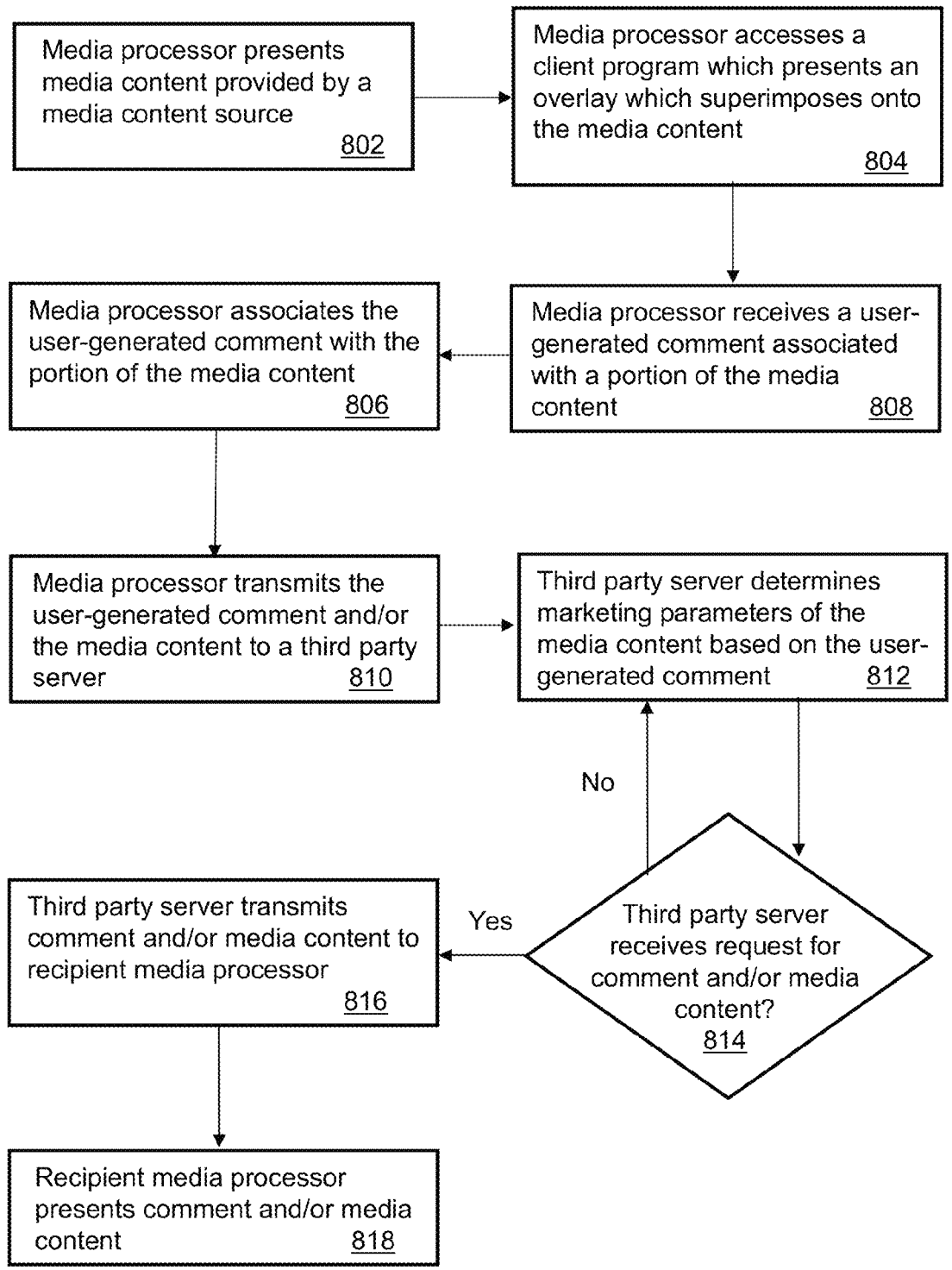
FIG. 8 depicts an illustrative embodiment of a method for product marketing, which is operable in portions of the communication systems of FIGS. 1-2 and 5.

FIG. 8 depicts an illustrative method 800 for product marketing that is operable in portions of the communication systems of FIGS. 1-2 and FIG. 5. Method 800 can begin with step 802 in which a media processor, such as an STB, can present media content provided by a media content source. The media content can be video content, audio content, still image content, text content, advertisement content, and/or other promotional content. For example, the media content can be a five second sample of a song that a user can purchase based on hearing the sample or an advertisement which advertises some type of product and/or service. At step 804, the media processor can access a client program, which can present an overlay that superimposes onto the media content presented by the media processor.

At step 806, the media processor can receive user information and/or a user-generated comment that can be associated with at least a portion of the media content via the client program or otherwise. The user-generated comment, for example, can indicate a user's preferences regarding the media content, a user's dislike of the media content, and a user's suggestions for improving the media content. Once the comment is received, the media processor can associate the user-generated comment with the portion of the media content at step 808. At step 810, the media processor can transmit the user-generated comment and/or the media content to a server, such as a third party server. Once the user-generated comment and/or media content is received by the server, the server can determine marketing parameters of the media content based on the user-generated comment at step 812.

As mentioned above the marketing parameters can include demographic parameters, psychographic parameters, popularity parameters, promotional effectiveness parameters, and other parameters. In an embodiment, the server and/or third party users can analyze the marketing parameters and the content of the comments to determine if the advertisement/promotional media content is effective. At step 814, the server can be configured to determine if it has received a request for the user-generated comments and/or media content from a recipient media processor. If not, the server can continue to determining marketing parameters and analyzing comments generated by the devices in the system 500. If the server has received a request for the user-generated comments and/or media content, the server can transmit the user-generated comments and/or media content to the recipient media processor at step 816. At step 818, the recipient media processor can present the user-generated comments and/or the media content. Notably, the method 800 can further incorporate the operative functionality of the above described systems and the features described below.

Upon reviewing the aforementioned embodiments, it would be evident to an artisan with ordinary skill in the art that said embodiments can be modified, reduced, or enhanced without departing from the scope and spirit of the claims described below. For example, the server 506 can be configured to receive comments associated with the substitute media content and can determine marketing parameters associated with the substitute media content based on the comments. The comments and parameters associated with the substituted media content can also be analyzed by the third party users. The third party users can then modify or alter the substitute media content of the comments and parameters indicate that a change is necessary.

In an embodiment, comments that describe other user's comments can also be analyzed by the server 506 and third party users for determining marketing parameters and the effectiveness of the media content/advertisements. In another embodiment, the server 506 and other devices of the system 500 can be configured to filter content from the comments. For example, if obscenities are found in the comments, the server 506 can filter and/or replace the obscene comments with comments that are not obscene. Additionally, the server 506 can be configured to compare comments and advertisements for multiple services and/or products and generate a report detailing which advertisements were the most effective. The report can also illustrate which demographics, psychographics, or other parameters are most responsive to a particular advertisement, whether it be positive, negative, or otherwise.

In yet another embodiment, the server 506 can be configured to assign a greater weight to comments coming from a particular demographic or psychographic and a lesser weight to others. For example, if a particular advertisement is targeted to males that are between the ages of 35-45, it may weigh comments coming from 15 year old males lower than comments coming from a 40 year old male.

Other suitable modifications can be applied to the present disclosure without departing from the scope of the claims below. Accordingly, the reader is directed to the claims section for a fuller understanding of the breadth and scope of the present disclosure.

Figure 9:
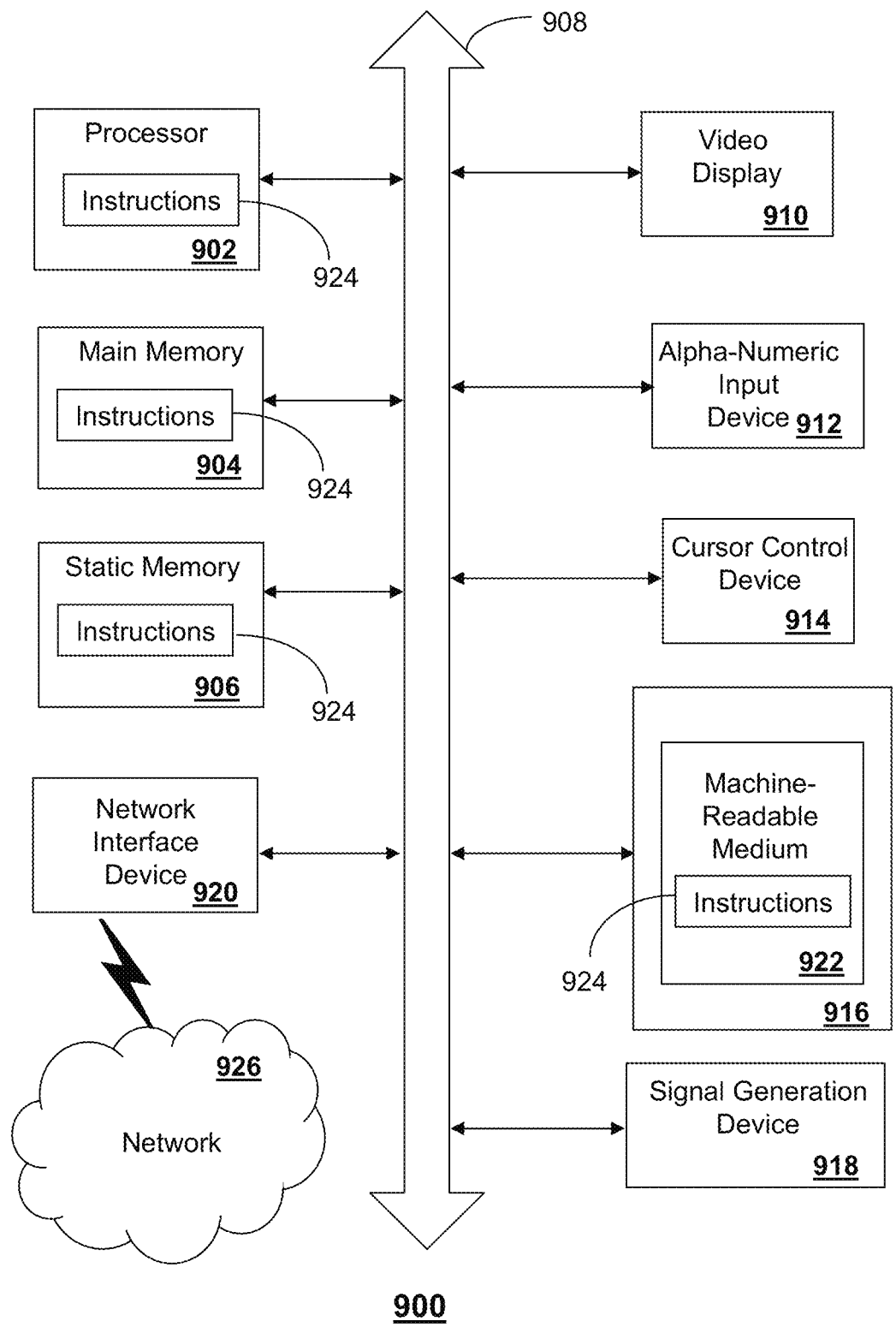
FIG. 9 is a diagrammatic representation of a machine in the form of a computer system within which a set of instructions, when executed, may cause the machine to perform any one or more of the methodologies discussed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media processor, comprising:
    a processing system including a processor; and
    a memory that stores executable instructions that, when executed by the processing system, facilitate performance of operations, comprising:
    presenting media content in a graphical user interface provided by a media content source operating in a network;
    presenting an overlay over the media content in the graphic user interface, the overlay being configured to receive a first user-generated comment initiated by a first viewer at the media processor in any segment of the media content in the graphic user interface and the overlay being configured to associate the first user-generated comment with a first portion of the media content relevant to first the user-generated comment, wherein the overlay further receives a second user-generated comment initiated by a second viewer at a second media processor, the second user-generated comment being initiated during a presentation of the media content by the second media processor and being associated with a second portion of the media content relevant to the second user-generated comment, wherein a client program provides an asynchronous interactive engagement between the media processor and the second media processor for the media content;
    receiving the first user-generated comment from the first viewer during the presenting of the media content, wherein the first user-generated comment provides commentary on the first portion of the media content;
    presenting a first update of the overlay with the first user-generated comment from the first viewer during the presenting of the media content;
    receiving the second user-generated comment from the second media processor over the network, wherein the second user-generated comment provides commentary on the second portion of the media content;
presenting a second update of the overlay with the second user-generated comment from the second viewer during the presenting of the media content;
transmitting the first user-generated comment and the second user-generated comment to a third party server for a determination of a favorability of the first user-generated comment and the second user-generated comment;
receiving updated media content based on the determination of the favorability, wherein the updated media content includes new substitute content;
presenting a third update of the overlay with the updated media content;
receiving a request by the third party for additional comments from the first viewer and the second viewer regarding the third update of the overlay; and
presenting the request through the overlay to receive the additional comments.

2. The media processor of claim 1, wherein the network comprises one of a television system and a broadcast television system.

3. The media processor of claim 1, wherein the determination by the third party server of the favorability comprises determining marketing parameters of the portion of the media content, and wherein the marketing parameters are associated with a product that is advertised by the portion of the media content.

4. The media processor of claim 3, wherein the marketing parameters describes characteristics of the viewer and of the media content based on weighting the first user-generated comment and the second user-generated comment according to a demographic category of the first viewer and the second viewer.

5. The media processor of claim 1, wherein the portion of the media content comprises one of an advertisement, a video clip, an audio clip, a still image, text content or a combination thereof.

6. The media processor of claim 4, wherein the media processor comprises a set-top-box, and
wherein the first user-generated comment is received as spontaneously generated by the viewer during a portion of the media content.

7. The media processor of claim 1, wherein the updated media content improves the favorability of the portion of the media content.

8. The media processor of claim 7, wherein the operations further comprise:
receiving the updated media content associated with the improvement to the portion of the media content; and
presenting the updated media content for receiving user-generated comments associated with the updated media content.

9. A method, comprising:
transmitting, by a processing system comprising a processor, a client program to a first media processor operating in an network, wherein the client program comprises a graphical user interface which presents an overlay that superimposes onto media content presented at the first media processor, the overlay being configured to receive a first user-generated comment initiated by a first viewer at the first media processor in any segment of the media content in the graphic user interface and being configured to associate the user-generated comment with a first portion of the media content relevant to the user-generated comment,
wherein the overlay further receives a second user-generated comment initiated by a second viewer at a second media processor, the second media processor being associated with the graphic user interface via the network, the second user-generated comment being initiated during a presentation of the media content by the second media processor in any segment of the media content in the graphic user interface and being associated with a second portion of the media content relevant to the second user-generated comment, wherein the client program provides an asynchronous interactive engagement between the first media processor and the second media processor for the media content;
receiving, by the processing system, the first user-generated comment from the first media processor responsive to the first media processor receiving the first user-generated comment initiated by the first viewer via the client program during the presenting of the media content;
receiving, by the processing system, the second user-generated comment from the second media processor;
determining, by the processing system, favorability of the first user-generated comment and the second user-generated comment;
generating, by the processing system, updated media content based on the favorability, wherein the updated media content comprises altered content;
transmitting, by the processing system, the updated media content to update a presentation of the overlay with the updated media content;
generating, by the processing system, a request for comments from the first viewer and the second viewer regarding the updated media content; and
transmitting, by the processing system, the request for comments to update the overlay at the first media processor and the second media processor with the request for comments.

10. The method of claim 9, wherein the network comprises one of a television system and a broadcast television system.

11. The method of claim 9, wherein the updated media content improves the favorability of the portion of the media content.

12. The method of claim 11, wherein the transmitting of the updated media content comprises transmitting, by the system, the updated media content to the first media processor and the second media processor, and wherein the method further comprises receiving, by the system, a third user-generated comment associated with the updated media content from one of the first media processor and the second media processor.

13. The method of claim 12, further comprising determining, by the system, a second favorability of the updated media content based on the second user-generated comment.

14. The method of claim 9, wherein the favorability describes characteristics of the viewer and of the media content.

15. The method of claim 9, further comprising:
receiving, by the system, a request for the user-generated comment associated with the media content from a recipient media processor; and
transmitting the user-generated comment to the recipient media processor.

16. A non-transitory machine-readable storage medium, comprising executable instructions that, when executed by a processor, facilitate performance of operations, comprising:

transmitting a request for media content and for a first user-generated comment associated with the media content to a computing device, wherein the first user-generated comment is associated with the media content by a first media processor in communication with the computing device, wherein the first user-generated comment is presented in a first overlay provided by a client program, and wherein the first overlay is configured to receive the first user-generated comment initiated by a first viewer in any segment of the media content and to associate the first user-generated comment with a first portion of the media content relevant to the first user-generated comment;

receiving the media content and the first user-generated comment from the computing device in the first overlay during the presenting of the media content;

presenting in a second overlay of a second media processor, the media content and the first user-generated comment, wherein the second media processor is associated with the first overlay via the computing device and the client program, wherein the second overlay is configured to receive a second user-generated comment initiated by a second viewer in any segment of the media content and to associate the second user-generated comment with a second portion of the media content relevant to the second user-generated comment, wherein the client program provides an asynchronous interactive engagement between the first media processor and the second media processor for the media content;

receiving the second user-generated comment associated with the media content in response to receiving the media content during the presenting of the media content;

presenting an update to the second overlay with the second user-generated comment from the second viewer;

transmitting the second user-generated comment to the computing device, wherein the computing device determines a favorability of the first user-generated comment and the second user-generated comment;

altering the media content to generate updated media content based on a determination of the favorability, wherein the updated media content comprises one of altered content and new substitute content;

transmitting the updated media content to update a presentation of the overlay with the updated media content;

receiving a request from the computing device for comments from the first viewer and the second viewer regarding the updated media content; and transmitting the request to update the overlay at the first media processor and the second media processor.

17. The non-transitory machine-readable storage medium of claim 16, wherein the favorability is associated with an entity that is advertised by the media content.

18. The non-transitory machine-readable storage medium of claim 16, wherein the operations further comprise:

receiving a third user-generated comment which provides commentary on the first user-generated comment; and transmitting the third user-generated comment to the computing device, wherein the favorability is updated based on the third user-generated comment.

19. The non-transitory machine-readable storage medium of claim 18, wherein the operations further comprise filtering content from the first and second user-generated comments, wherein the filtered content is replaced with alternative user-generated comments.

20. The non-transitory machine-readable storage medium of claim 16, wherein the favorability comprises characteristics of the first user and of the media content.

* * * * *